United States Patent
Zak (10) Patent No.: US 11,370,111 B2
(45) Date of Patent: Jun. 28, 2022

(54) SYSTEM AND METHOD FOR ADAPTIVE BIN PICKING FOR MANUFACTURING

(71) Applicants: MAGNA INTERNATIONAL INC., Aurora (CA); Alexander Zak, Troy, MI (US)

(72) Inventor: Alexander Zak, Troy, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 137 days.

(21) Appl. No.: 16/648,450

(22) PCT Filed: Sep. 20, 2018

(86) PCT No.: PCT/US2018/051924
§ 371 (c)(1),
(2) Date: Mar. 18, 2020

(87) PCT Pub. No.: WO2019/060529
PCT Pub. Date: Mar. 28, 2019

(65) Prior Publication Data
US 2020/0223064 A1    Jul. 16, 2020

Related U.S. Application Data

(60) Provisional application No. 62/560,968, filed on Sep. 20, 2017.

(51) Int. Cl.
*B25J 9/16*    (2006.01)

(52) U.S. Cl.
CPC .......... *B25J 9/1612* (2013.01); *B25J 9/1697* (2013.01); *G05B 2219/40053* (2013.01)

(58) Field of Classification Search
CPC ...... B25J 9/1612; B25J 9/1697; B25J 9/1671; G05B 2219/40053; G05B 2219/40014; G05B 2219/40515
(Continued)

(56) References Cited

U.S. PATENT DOCUMENTS 4,613,269 A * 9/1986 Wilder .................. B25J 9/1697
                                                                       348/92
5,041,907 A * 8/1991 Sager .................... B25J 9/1697
                                                                       348/91
(Continued)

FOREIGN PATENT DOCUMENTS

CN    104956850 A    10/2015
CN    206230514 U     6/2017
(Continued)

OTHER PUBLICATIONS

Search report in corresponding Chinese Application No. CN 201800606840, dated Jun. 24, 2021.
(Continued)

*Primary Examiner* — Jaime Figueroa
(74) *Attorney, Agent, or Firm* — Dickinson Wright PLLC (57) ABSTRACT

A system and method for automatically moving one or more items between a structure at a source location and a destination using a robot is provided. The system includes first and second vision systems to identify an item and to determine the precise location and orientation of the item at the source location and the precise location and orientation of the destination, which may or may not be in a fixed location. A controller plans the best path for the robot to follow in moving the item between the source location and the destination. An end effector on the robot picks the item from the source location, holds it as the robot moves, and places the item at the destination. The system may also check the item for quality by one or both of the vision systems. An example of loading and unloading baskets from a machine is provided.

20 Claims, 5 Drawing Sheets

(58) Field of Classification Search
USPC .................................................. 700/245–264
See application file for complete search history.

(56) References Cited

U.S. PATENT DOCUMENTS

| | | | | |
|---|---|---|---|---|
| 7,559,134 | B2* | 7/2009 | Gaida | H05K 13/0815 29/720 |
| 7,957,583 | B2* | 6/2011 | Boca | G06T 7/75 382/154 |
| 8,095,237 | B2* | 1/2012 | Habibi | B25J 9/1692 318/568.13 |
| 8,539,739 | B2 | 9/2013 | Pierson et al. | |
| 9,687,983 | B1* | 6/2017 | Prats | G06V 20/58 |
| 9,694,494 | B1* | 7/2017 | Stubbs | B25J 9/1612 |
| 9,694,498 | B2* | 7/2017 | Konolige | G06T 1/0014 |
| 11,040,447 | B2 | 6/2021 | Zak et al. | |
| 2003/0110610 | A1* | 6/2003 | Duquette | H05K 13/0818 29/407.09 |
| 2005/0276464 | A1* | 12/2005 | Duquette | G06T 7/337 382/151 |
| 2011/0153076 | A1 | 6/2011 | Noro | |
| 2012/0165986 | A1* | 6/2012 | Fuhlbrigge | B25J 9/1687 700/259 |
| 2013/0166061 | A1 | 6/2013 | Yamamoto | |
| 2013/0223673 | A1* | 8/2013 | Davis | G06K 9/18 382/100 |
| 2016/0016311 | A1 | 1/2016 | Konolige et al. | |
| 2016/0167227 | A1* | 6/2016 | Wellman | B25J 9/1612 700/259 |
| 2016/0221187 | A1 | 8/2016 | Bradski et al. | |
| 2016/0288330 | A1* | 10/2016 | Konolige | H04N 13/254 |
| 2016/0288331 | A1* | 10/2016 | Sivich | B25J 9/162 |
| 2017/0024613 | A1* | 1/2017 | Shivaram | B25J 9/1697 |
| 2017/0066133 | A1* | 3/2017 | Ooba | G05B 19/4182 |
| 2017/0080566 | A1* | 3/2017 | Stubbs | B25J 9/163 |
| 2017/0121113 | A1* | 5/2017 | Wagner | B07C 5/36 |
| 2017/0148154 | A1* | 5/2017 | Nakao | G06T 7/74 |
| 2017/0153646 | A1* | 6/2017 | Shin | G05D 1/0253 |
| 2017/0157649 | A1* | 6/2017 | Wagner | B07C 5/36 |
| 2017/0160737 | A1* | 6/2017 | Towal | H04N 5/23203 |
| 2017/0225330 | A1 | 8/2017 | Wagner et al. | |
| 2017/0252922 | A1* | 9/2017 | Levine | B25J 9/1664 |
| 2017/0252924 | A1* | 9/2017 | Vijayanarasimhan | G05B 19/18 |
| 2017/0312789 | A1* | 11/2017 | Schroader | B65G 47/54 |
| 2017/0313514 | A1* | 11/2017 | Lert, Jr. | B65G 1/0492 |
| 2018/0084242 | A1* | 3/2018 | Rublee | G06K 9/6215 |

FOREIGN PATENT DOCUMENTS

| | | |
|---|---|---|
| CN | 109791614 A | 5/2019 |
| EP | 2221152 A1 | 8/2010 |
| EP | 3485427 A1 | 5/2019 |
| WO | 2018014023 A1 | 1/2018 |

OTHER PUBLICATIONS

Supplementary European Search Report in EP Application No. EP 18855760, dated May 7, 2021.

\* cited by examiner

SYSTEM AND METHOD FOR ADAPTIVE BIN PICKING FOR MANUFACTURING

CROSS REFERENCE TO RELATED APPLICATION

This U.S. National Stage Patent Application claims the benefit of PCT International Patent Application Serial No. PCT/US2018/051924 filed Sep. 20, 2018 entitled "System And Method For Adaptive Bin Picking For Manufacturing" which claims the benefit of U.S. Provisional Patent Application Ser. No. 62/560,968 filed Sep. 20, 2017 entitled "System And Method For Adaptive Bin Picking For Manufacturing," the entire disclosures of the applications being considered part of the disclosure of this application and hereby incorporated by reference.

BACKGROUND

Assembly processes (or lines) are implemented to produce a finished good. The finished goods are a combination of various parts that are attached together through various techniques. A finished good may be any sort of object or product, for example, those sold in commerce. An automobile or vehicle, or a part of an automobile or vehicle, may be a finished good produced via an assembly process. Many aspects of a manufacturing process involve moving items, such as individual parts, assemblies, or carriers holding one or more individual parts or assemblies for transport or for processing together.

Many finished goods include parts from a variety of sources, which are transported to and within manufacturing locations to be combined into finished goods or into assemblies or sub-assemblies thereof. These parts are frequently transported in bins, where they may be loose, having random locations and orientations. Parts must be transferred from the bins to a destination to facilitate the use of the part in the manufacturing process. Parts are also frequently processed in batches using specialized carriers such as baskets, bins, or paint bucks, which must be loaded and unloaded with individual parts or assemblies. Also, in some cases, movement of the carriers requires special handling due to the requirements of the manufacturing process and/or other considerations such as weight and/or size of the loaded or unloaded carriers.

For many portions of a manufacturing process, the current technique of moving items is a manual process. Special considerations are required in moving large and/or heavy items. For example, stamped metal parts are commonly picked by a human from a bin and placed into a fixture for further processing (e.g., cutting, welding, adhesion, or painting). After processing, the human may pick the parts from a fixture and place them into a bin, which may be a new bin or the same bin from which the parts originated. During the pick/place operations, the human may also perform quality checks on the part.

In another example a process of loading vehicle fascias onto paint bucks, or racks used in paint processes, may require a crew, with persons alternating between picking from the walk-in bin (at floor level) and placing the parts in a buck (at hip level) by transferring the part to each other in order to relieve the ergonomic stressors.

In yet another example, a process of loading and unloading baskets of parts to be washed from a washing machine may be performed manually, and/or with the aid of a crane, which may be required by health and safety regulations for baskets that weigh more than a predetermined amount.

In this way, each item that enters a given step of the manufacturing process may require a manual operation of picking and placing the part at a destination location and orientation that is suitable for the next step in the manufacturing process. Heavy items may cause fatigue in the humans who perform these operations. The use of a mechanical aid, such as a crane, may be required to move heavy items; however, such mechanical aids may be difficult to use and may not be embraced by staff. Repetitive motions, may contribute to costly injuries, particularly with moving heavy items. These manual operations may introduce delays and inefficiencies to the overall assembly line process.

SUMMARY

A conveyance system and method for automatically moving one or more items between a source location and a destination using a robot is provided. The system includes a first vision system to identify an item and to determine a pick location and a pick orientation of the item upon a structure. A second vision system determines the location and orientation of a destination. A controller plans the best path for the robot to follow in moving the item between the pick location and the destination. An end effector is attached to the robot for picking the item and holding the item as the robot moves the item to the destination. The end effector then releases, or places the item at the destination location and with a destination orientation.

The method includes the steps of identifying an item having a non-fixed location and orientation at the source location using a first vision system; determining the pick location and pick orientation of the item within the source location using the first vision system; and determining the location and orientation of a destination using a second vision system. The method also includes the step of performing adaptive trajectory planning to determine the best path between the pick location and the destination.

The method proceeds with the steps of picking the item from the pick location by the end effector on the robot; moving the item along the best path by the robot; placing the item at the destination by the end effector on the robot. The method may also include the step of checking the part for quality by one or both of the vision systems.

Employing the aspects disclosed herein, a system and method may automatically move one or more items between a bin at the source location and a destination using a robot with an end effector. The flexible fixtures disclosed herein allow for a variety of part types to be moved from a bin where they may be loose, having random locations and orientations. Further, due to the automated nature of the methods discussed herein, gains in efficiency and resource reduction are achieved.

DESCRIPTION OF THE DRAWINGS

The detailed description refers to the following drawings, in which like numerals refer to like items, and in which.

DETAILED DESCRIPTION OF THE EXAMPLE EMBODIMENTS

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g., XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Referring to the Figures, wherein like numerals indicate corresponding parts throughout the several views, a conveyance system 20 and method for automatically moving one or more items 21 between a structure at a source location 26 and a destination 28 using a robot 30 with an end effector 32 are disclosed.

Figure 1:
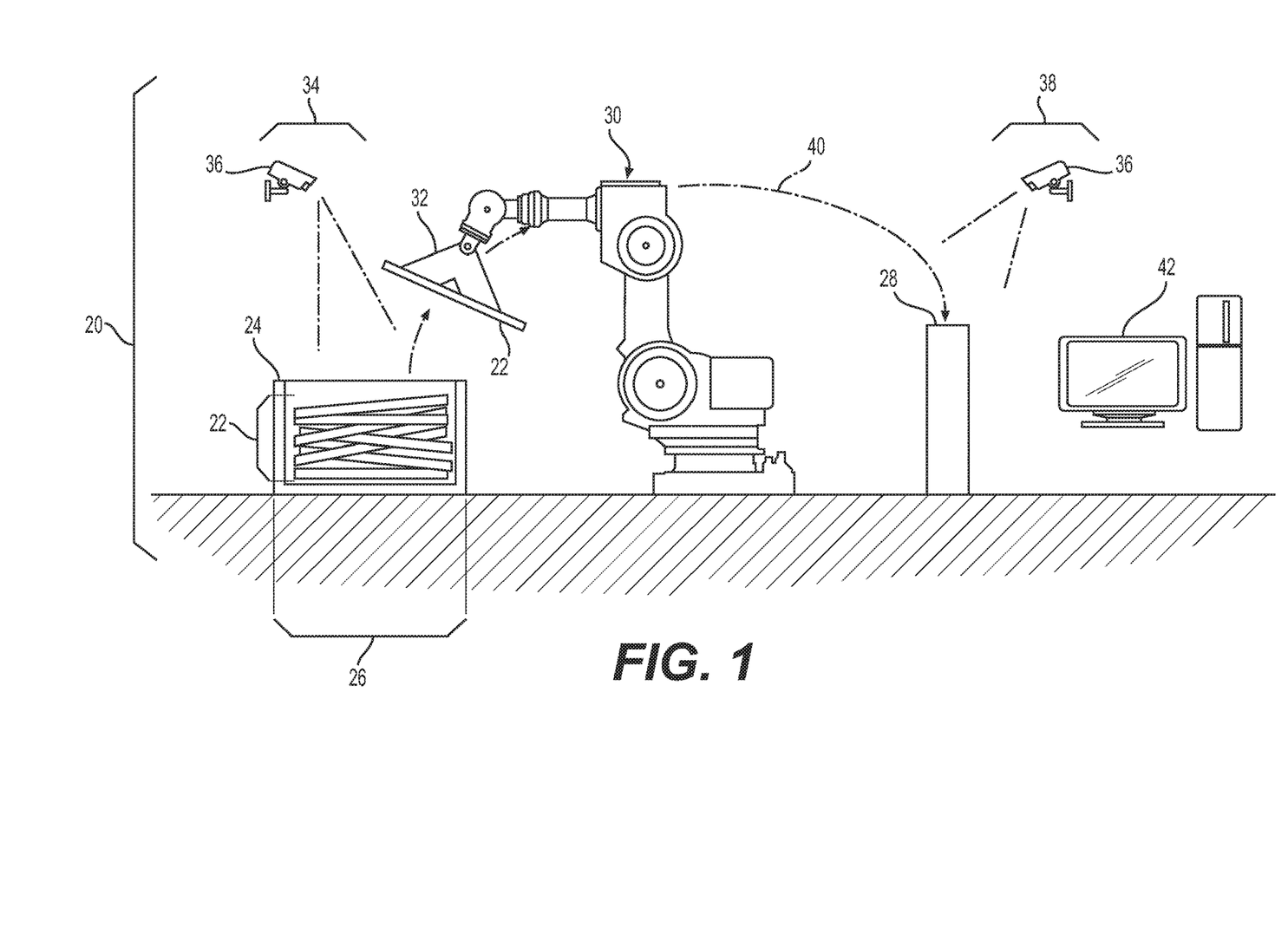
FIG. 1 is a schematic diagram of a system for automatically moving one or more parts between a bin at a source location and a destination.

One example of the conveyance system 20 of the present disclosure is shown in FIG. 1 for automatically moving one or more parts 22 between a bin 24 at a source location 26 and a destination 28 using a robot 30 with an end effector 32, and where the parts 22 may be loose or not fixed in specific locations in the bin 24. As used in this disclosure, a bin 24 may include any box, rack, tray, or other carrier for holding parts 22. It should be appreciated that the term "part" 22 as discussed throughout the subject disclosure, including the claims, may encompass various types of objects including, but not limited to, raw materials, housings, and component pieces in any stage of manufacture, assemblies or sub-assemblies in any stage of construction, and finished pieces or assemblies. A variety of different items 21 may be accommodated and moved by the same conveyance system 20, using the same or different end effectors 32. It should also be appreciated that the term "item" 21 may refer to a part 22, a bin 24, or any other physical item including, but not limited to a tool, part, fixture, raw material, housing, component piece in any stage of manufacture, assembly or sub-assembly in any stage of construction, finished pieces or assemblies, a box, rack, tray, or other carrier.

As best shown in FIG. 1, a first vision system 34 may identify a part 22 within the bin 24 at a source location 26 and determine a pick location, and a pick orientation of the part 22. A second vision system 38 may determine the location and orientation of a destination 28, which may be inside or outside of the bin 24. The destination 28 may be any place where one or more parts are to be moved, including, for example: fixtures or carriers for manufacturing or inspection, shipment, etc.; racks or packages for storage or conveyance; conveyors; fixtures or assemblies in any stage of manufacture. The destination 28 may be fixed in position and orientation. The destination 28 may be variable in position and/or orientation, such as for parts being placed on an assembly as it moves along an assembly line. Additionally, the destination 28 for each of a series of parts 22 may be different, for example in cases where a rack, or other such assembly is loaded with a plurality of parts 22, with each part 22 in a separate compartment or location on the rack.

Each of the vision systems 34, 38 may be any type of machine vision system, including one or more cameras 36 or other imaging devices and including but not limited to 2D, 2.5D, and 3D systems capable of identifying and locating a part 22 in 3-dimensional space, having x, y, and z coordinates, as well as a 3-dimensional orientation of roll, pitch, and yaw. One example of such a machine vision system is the camera system manufactured by Cognex. Such identifying and locating may be done using direct observations and measurements, through comparisons with one or more reference images, through any other method or combination of methods.

The conveyance system 20 includes a robot 30 having an end effector 32 to pick the part 22 from the bin 24, move the part 22 along a path 40, and place the part 22 at the destination 28. The end effector 32 may be an advanced effector (e.g., tooling), or any other effector capable of moving an item 21 including, but not limited to, a grasp, clamp, and a suction device. The system also includes a controller 42 for planning a best path 40 for the robot 30 to follow in moving the item 21 between the source location 26 and the destination 28.

Figure 2:
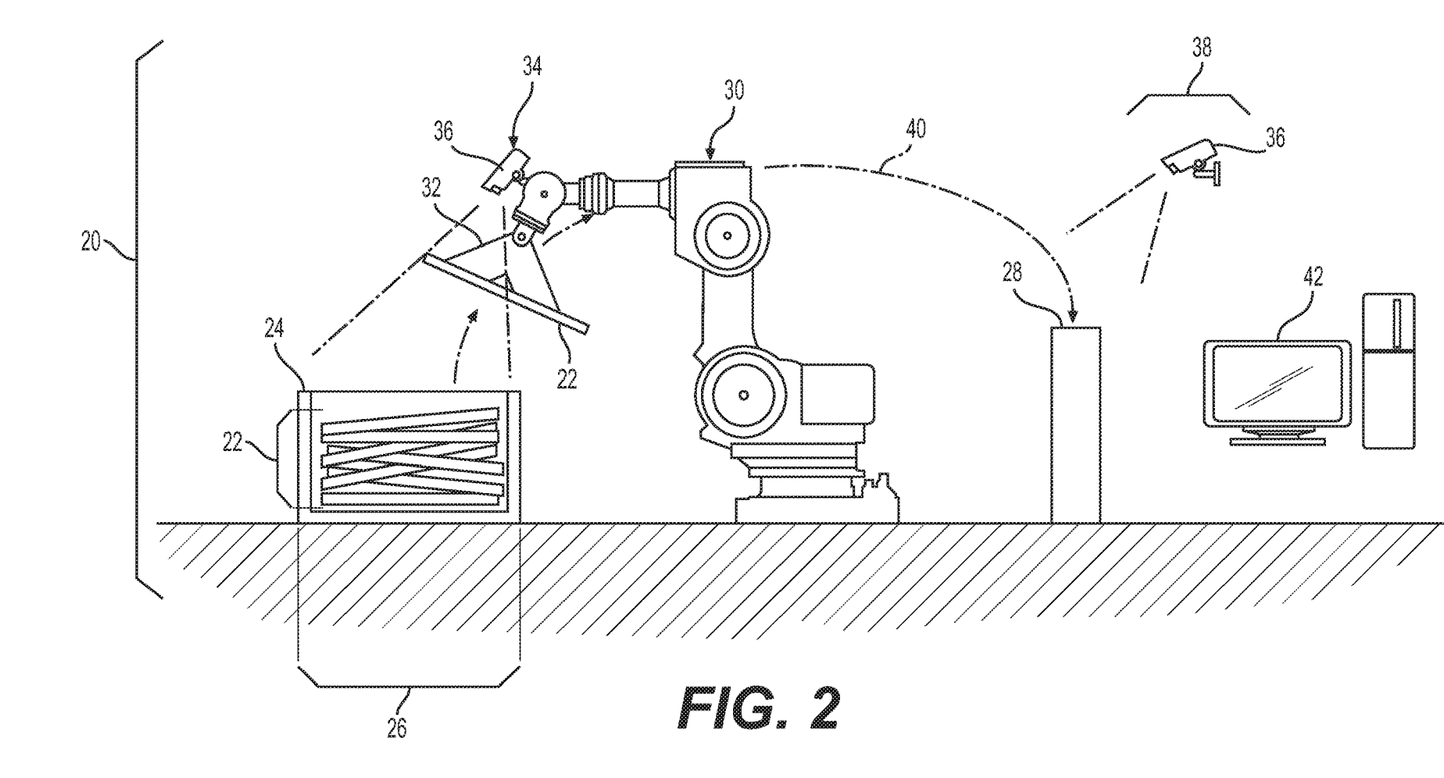
FIG. 2 is another schematic diagram of a system for automatically moving one or more parts between a bin at a source location and a destination.

Each of the vision systems 34, 38 may include one or more cameras 36 located at fixed positions, as shown on FIG. 1. Alternatively or additionally, the first vision system 34 may include a camera 36 that is located on the robot 30, as shown on FIG. 2. More specifically, the camera 36 may be located on or near a free or distal end of the robot 30. The camera 36 may be located on the end effector 32 of the robot 30 or on another part of the robot 30, such as a joint or a structural component near the end effector 32. Such a robot-mounted camera 36 may be used instead of or in addition to one or more cameras 36 at fixed positions. Alternatively or additionally, the second vision system 38 may include a camera 36 that is located on the robot 30. In one embodiment, the vision systems 34, 38 may share one or more cameras 36 that are mounted on the robot 30. In other words, the vision systems 34, 38 may each be configured to use a shared camera mounted on the robot. Such a configuration may include one of the vision systems 34, 38 passing an image signal from the shared camera to the other one the vision systems 34, 38. Alternatively, an image from the shared camera may be provided to each of the vision systems 34, 38 from the shared camera or from another device, such as a signal splitter.

Figure 3:
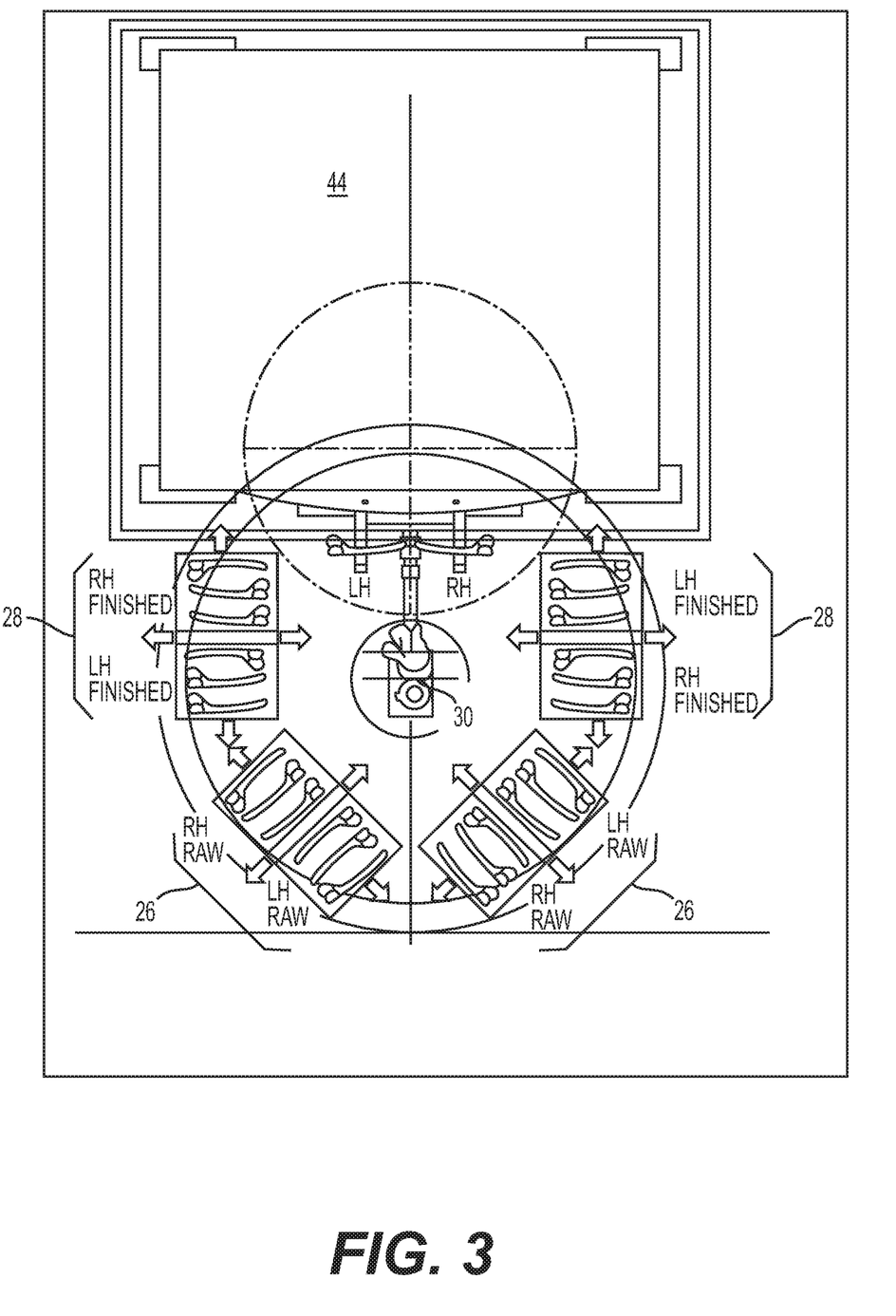
FIG. 3 is a top view of a machine and bins around a robot for automated loading and unloading of the machine, with each bin being located within a window and without a locating fixture.

As shown in FIG. 3, an example application of the conveyance system 20 of the present invention may be to replace a manual operation of loading and unloading vehicle fascias onto paint bucks, or racks used in paint processes. For example, the process of loading the paint bucks may require a crew, with persons alternating between picking from the walk-in bin (at floor level) and placing the parts in a buck (at hip level) and by transferring the part to each other in order to relieve the ergonomic stressors. As shown in FIG. 3, the conveyance system 20 of the present invention may replace the manual loading and unloading of vehicle fascias to and from paint bucks and may allow the combined operation to be performed with fewer persons per shift. The bins 24 may be located within a general window area, which may be a predetermined tolerance value from a predetermined nominal position or boundary. The bins 24 may not need to be secured or placed in an exact location, and therefore may not require locating fixtures. The parts 22 may be fixed within the bins 24, such as by fixtures formed in the bins 24, and the number of parts within a bin 24 may vary. The conveyance system 20 of the present disclosure may accommodate several different types of parts, such as for different vehicle models. For example, a conveyance system 20 may accommodate 17 or more different types of parts. According to an aspect, the conveyance system 20 may require both the source and the destination to be stationary. Alternatively, the conveyance system 20 may allow the loading and unloading of bucks which are moving in up to two different directions simultaneously, such as may result from being moved along a curved segment of conveyor track. The conveyance system 20 of the present disclosure may provide for faster and/or more consistent cycle times in loading or unloading parts 22 when compared to the manual loading and unloading operations of the prior art and may allow for a direct labor reduction from 5 persons per shift to 1 person per shift.

As shown in FIG. 3, the conveyance system 20 may be used to control a robot 30 to move one or more parts 22 into and out of a machine 44. The robot 30 may pick one or more parts 22 from a source location 26, which may be, for example, a first bin 24 holding raw, or unfinished parts 22, and carry the parts 22 to the machine 44 for processing, after which the robot 30 may remove pick the finished parts 22 to a destination 28, which may be, for example, a second bin 24 for transporting the finished parts 22 to another area. In the example shown in FIG. 3, the robot 30 may load and unload right-hand (RH) and left-hand (LH) parts 22 for simultaneous processing by the machine 44. The conveyance system 20 may accommodate some variation in the placement of the bins 24 used for the source location 26 and the destination 28. Such variation may allow the source and destination bins 26, 28 to be located anywhere within a window of space in each direction from a nominal position. Therefore, the bins 24 do not need to be secured in a precise location and may not require a locating fixture. The robot 30 may accommodate for variations in the location and tolerances of the parts 22. According to an aspect, the conveyance system 20 may inspect the finished parts 22, to ensure that the finished parts 22 were properly processed by the machine 44 before the parts 22 are allowed to be processed further. Such an inspection may be, for example, a hole inspection to verify that holes are properly made in the parts 22. According to a further aspect, conveyance system 20 may accommodate a variation in the number of parts 22 or bins 24 located at the source location 26 and/or the destination 28, such as variations in the stack height, and may automatically pick or place parts 22 from the top of a stack of bins 24. Such a system 20 may replace a current manual loading and unloading operation and may occupy the same or a smaller square footage footprint on a building floor. The example shown in FIG. 3 may allow a reduction from 1 to 0 direct labor on each shift to perform the loading and unloading of parts 22 from the machine 44.

Figure 4:
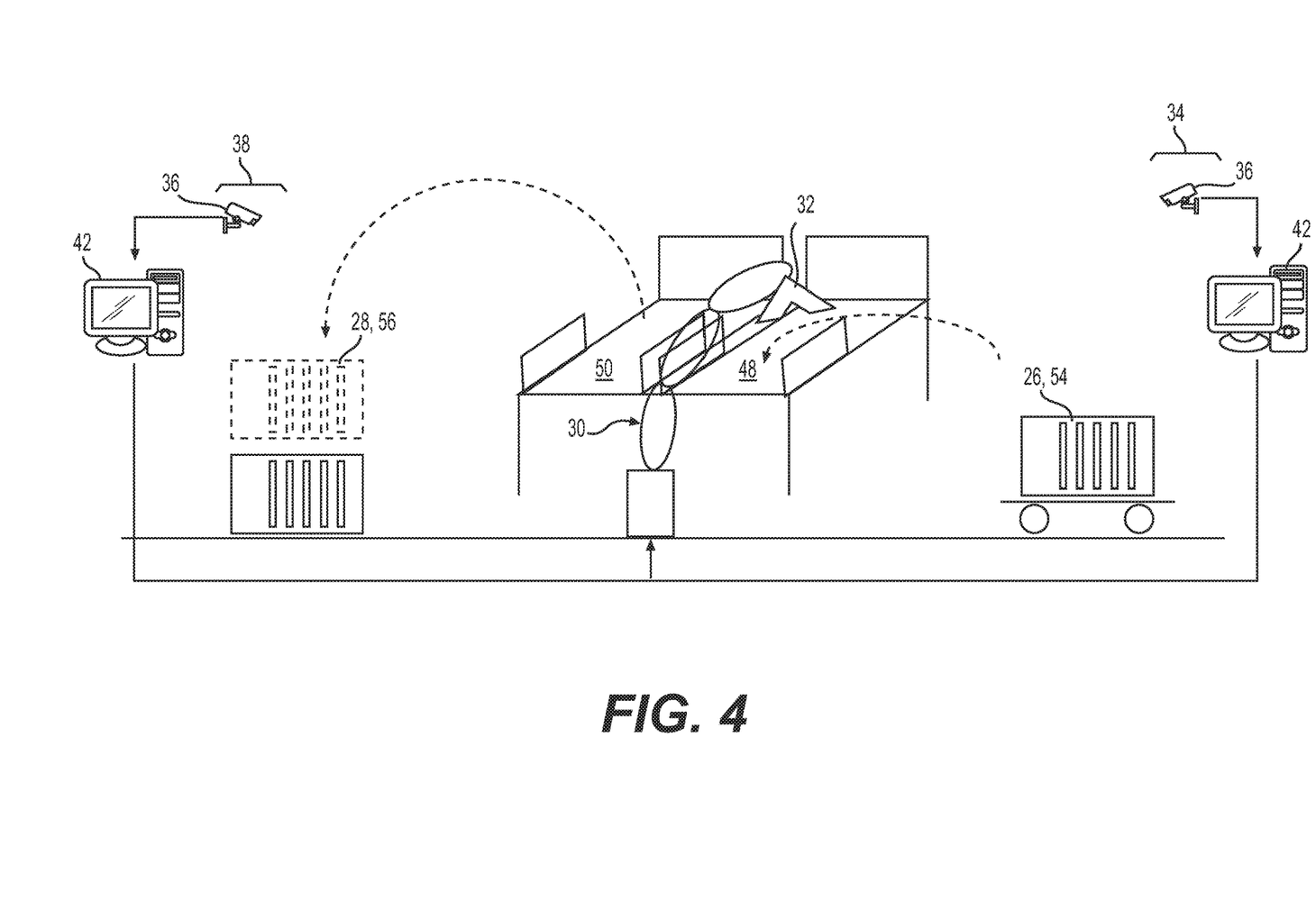
FIG. 4 is a schematic diagram of an automated process for loading and unloading of baskets of parts to and from a machine according to an aspect of the present invention.

As shown in FIG. 4, an example application of the conveyance system 20 of the present invention may be to replace a manual operation of loading and unloading baskets 46 of parts 22 into and out of a machine 44. In the example shown, the machine 44 is a washer with an input belt 48 for receiving baskets 46 of dirty parts 22 and an output belt 50 for removal of baskets 46 cleaned parts 22. Parts 22 to be washed arrive in a basket 46 and are placed in a defined position on a rack inside the basket 46. The operator may load a basket 46 from a source location 26 onto the input belt 48 and may then unload the basket 46 from the output belt 50 by moving the basket 46 to a destination 28. The baskets 46, with parts 22 may require the use of a mechanical aid such as a crane 52 to lift in order to be compliant with health and safety regulations. The use of a crane 52 may be difficult and/or cumbersome to use and may not be embraced by staff. The operator loading and unloading the machine 44 may perform quality, quantity, and data logging tasks on the parts 22.

The process of manually loading and unloading a washing machine 44 may involve the following steps:

Step 1: The operator takes the basket 46 off a standing/fixed delivery carriage 54 and places the basket 46 on the input belt 48 on the right side of the washing machine 44.

Step 2: The operator takes the basket 46 off the output belt 50 on the left side of the washing machine 44 and places the basket 46 on a stationary carriage 56 in a defined area with. Stack height may vary depending on how many baskets 46 are already in place on the carriage 56.

As illustrated in FIG. 4, the carriage 56 may be fixed, being stationary and located in a general predetermined location window, shown as a taped rectangle on the floor, but the carriages 56 do not need to be located or secured in a precise position such as by using a mechanical carriage fixing device. The loading and unloading operations are not time-critical. The cycle time of the machine may allow for some variation in when the baskets 46 are loaded and unloaded. The loading and loading operations may require careful handling. The baskets 46 may vary in weight and height to accommodate different numbers and types of parts 22. Due to the physical constraints of the machine 44 and the carriages 54, 56, fencing for a traditional robot cell around the machine 44 may not be feasible.

As shown in FIG. 4, the conveyance system 20 including a robot 30 may be used to load and unload baskets 46 of parts 22 from the washing machine 44. The system 20 may locate a basket 46 from the standing/fixed delivery carriage 54 and may pick the basket 46 with an end effector 32 on the robot 30, which may place the basket 46 on the input belt 48 (dirty parts) of the washing machine 44. The system 20 may detect and locate a basket 46 on the output belt 50 of the washing machine 44 and may move the basket 46 onto stack on a carriage 56. The conveyance system 20 may use cameras 36 accommodate baskets 46 that vary in size and weight and which are not fixed in a specific location. The conveyance system 20 may perform quantity, quality inspection, and data logging tasks. The conveyance system 20 may allow baskets to be stacked at different positions on a carriage 56 which may vary according to the existing load on that carriage 56. The system 20 may provide for loading and unloading cycle times of less than 80 s to prevent any bottleneck at the loading or unloading steps. The robot 30 may have TUV certified skin technology and may recognize and/or inform humans in the working area. In this way, the robot 30 may be able to operate without protective fencing.

Figure 5:
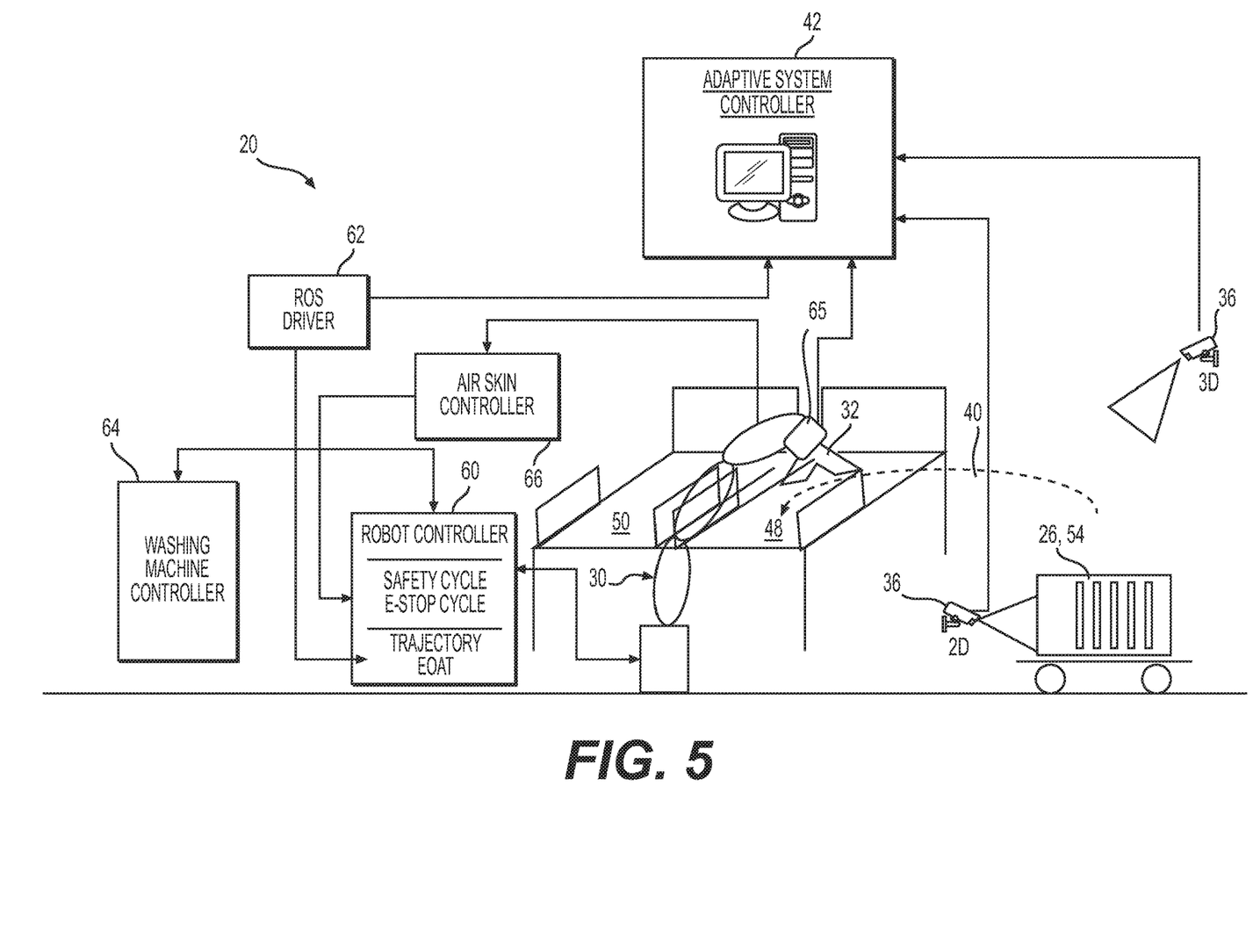
FIG. 5 is another schematic diagram of the automated process for loading and unloading of baskets of parts according to an aspect of the present invention.

FIGS. 4 and 5 provide schematic views of the conveyance system 20 of the present disclosure as used for the example application of loading and unloading baskets 46 of parts 22 from a washing machine 44.

As shown in FIG. 4, a first vision system 34 including at least one camera 36 may identify a basket 46 including its precise pick location and pick orientation in the source location 26, which may be delivery carriage 54 holding a stack of one or more baskets 46. The robot 30 may pick the basket 46 from the source location 26 and move the basket 46 to the input belt 48 of the washing machine 44. A camera 36 may not be required to cover the input and/or output belts 48, 50, as those locations may be fixed, and their status as empty or loaded with a basket 46 may be communicated to the conveyance system 20 from the machine 44. The conveyance system 20 may also perform the step of unloading the washing machine 44 by picking up a basket 46 from the output belt 50 and placing that basket at a destination location 28, which may be the top of a stack of other baskets 46 upon a carriage 56. The precise location and orientation of the destination 28 may vary according to the exact location of the carriage and/or the height of the stack of baskets 46 and may be determined by the second vision system 38 using one or more cameras 36. The system 20 may provide adaptive trajectory planning to determine the best path to move the baskets 46.

As illustrated in FIG. 5, the system 20 may include a controller 42 for planning a best path 40 for the robot 30 to follow in moving an item 21, which may be a basket 46, between the source location 26 and the destination 28. One or more cameras 36 may provide a 3-dimensional view to detect the exact position of a basket 46. The system 20 may also detect the number and shape of individual parts 22 in the basket 46. The controller 42 may perform several functions in the system 20, which may include, for example, 2D inspection of a basket 46 and parts 22 therein; 3D perception and localization; perception and load & force measurement; production process sequencing, providing a production graphical user interface (GUI); calibration and configuration software; and Production process specific motion planning and control, including the control of the end effector 32, also called end-of-arm-tooling (EOAT). The robot 30 may be a standard type used in industry for automation tasks, and the end effector 32 may be configured to grasp the standard basket 46 of different weights.

The controller 42 may provide adaptive trajectory planning using the information provided by the vision systems (pick part and place part), as well as predetermined or fixed locations to calculate the best trajectory for the robot to follow in picking and placing the item 21. The robot 30 may be directly controlled by a robot controller 60 which may handle safety functions, movement control, and control of the end effector 32. The controller 42 may coordinate and communicate with a robot operating system (ROS) driver 62. The controller 42 may also be operatively connected to a machine controller 64, such as the controller of the washing machine 44. This connection to the machine controller 64 may allow the system 20 to know when items may be loaded onto or removed from the machine 44. The operative connections between devices may include electrical, radio, optical, light-based, and/or mechanical interconnections and may be wired or wireless.

The robot 30 may be equipped with touch sensors 65, which may include pressurized air pads on the end effector 32 or gripper, which may allow the robot 30 to be used without the need for fencing. A touch sensor controller 66, such as an air skin controller, may be used to monitor the status of one or more touch sensors 65 on the robot 30, and may be operatively connected to a safety circuit of the robot controller 60. In order to allow the robot 30 to operate without traditional safety fencing, such a touch sensor configuration may require safety performance level E and may require the robot 30 to be able to react to all humans on the shop floor including operators, visitors, supplier staff, etc. The touch sensor controller 66 may also be operatively connected to the adaptive system controller 42.

After processing by the washing machine 44, a camera 36 may identify a destination location 28 being a desired stack of baskets 46 upon a carriage 56 and which may vary in height as additional baskets 46 are added to the stack.

The conveyance system 20 of the present disclosure may provide the following functions: transporting a basket 46 accounting for variations in the precise special arrangement (x, y, z, roll, pitch, yaw) of both the pick and the place operations; identifying the general source and destination location 26, 28 (x, y, z, yaw) from a stack of one or more baskets 46 at each location 26, 28; type identification of baskets 46 (height, weight, insert feature & geometry); identifying interactions between baskets 46 (tangled or various other interactions matching predetermined criteria, such as being caught upon another item 21 and which may be known as easy to take apart); recognizing and reporting a damaged basket 46.

The conveyance system 20 may also provide for identification and information sharing regarding the items 21 being moved, such as, for example by reading a bar code on the baskets 46, and may also identify individual parts 22 within a basket 46, such as by their shape and size in 3-D space, and/or by their positioning within an insert in the basket 46. It may provide a mode in which the robot 30 drains fluid from the carriage 56, such as, for example, by moving the carriage 56 to a designated dumping location and opening a drain valve or by tilting the carriage 56.

The conveyance system 20 may automatically calibrate to account to changes in the environment, such as temperature and/or lighting, and may provide for environmental awareness, such as for crash detection and awareness. In other words, the cameras 36 of the conveyance system 20 may detect persons or other hazards, and may direct the robot 30 to avoid any such hazards. The conveyance system 20 may provide for increased system reliability and may allow for different sequencing or sorting baskets 46, such as, for example, in normal or special operation modes.

The present disclosure also provides a method for automatically moving one or more items 21 between a structure at a source location 26 and a destination 28 using a robot 30 with an end effector 32. The items 21 may be individual parts 22 or assemblies of parts 22 or other things such as a basket 46 for holding several parts 22. The structure may be a bin 24 for holding parts 22. The structure may also be, for example, a cart or a stack or a conveyor for holding or moving parts 22 or baskets 46. The method includes the steps of identifying a part 22 having a non-fixed location and orientation upon the structure at the source location 26 using a first vision system 34; determining the precise pick location and pick orientation of the part 22 upon the structure using the first vision system 34; and determining the location and orientation of a destination 28 using a second vision system 38. The first and second vision systems 34, 38 may be a combined vision system and may use one or more of the same cameras 36. The method also includes the step of performing adaptive trajectory planning to determine the best path 40 between the source location 26 and the destination 28. According to an aspect, the step of performing adaptive trajectory planning may include the sub-steps of planning a plurality of possible paths 40 between the source location 26 and the destination incorporating geometrical information of the robot and source location 26 and the pick orientation and the destination 28 which may include the target location and the target orientation; and determining a best path 40 between the source location 26 and the destination 28 by simulating the plurality of possible paths 40 between the source location 26 and the destination 28. One example of such an active trajectory planning is ROS (Robotic Operating System).

The method proceeds with the steps of picking the item 21 from the source location 26 by the end effector 32 on the robot 30; moving the item 21 along the best path 40 by the robot 30; placing the item 21 at the destination 28 by the end effector 32 on the robot 30. The method may also include the step of checking the item 21 for quality and/or other characteristics by one or more of the first vision system 34 and the second vision system 38.

According to an aspect, the destination 28 may have a fixed position and orientation. According to another aspect, the destination 28 may have a varying position, and/or orientation or one which is not fixed in space. According to another aspect, the item 21 may be disposed loosely or in a fixed position within a bin 24 at the source location 26.

According to an aspect, the first vision 34 system may be a 2D vision system and the method may further comprise the step of comparing by the first vision system 34 an image of the item 21 to a reference image to determine the source location 26 and the orientation of the item 21 at the source location 26, also called the pick orientation. According to another aspect, the first vision system 34 may be a 3D vision system, which may be capable of directly determining the source location 26 and pick orientation. According to an aspect, the system 20 may be used for two or more distinct pick-and-place operations such as, for example loading and unloading a machine 44 as shown in FIG. 4.

According to an aspect, the second vision system 38 may be a 2D vision system and the method may further comprise the step of comparing by the second vision system 38 an image of the item 21 to a reference image to determine the location and orientation of the destination 28. According to another aspect, the second vision system 38 may be a 3D vision system, which may directly determine the location orientation of the destination 28.

Obviously, many modifications and variations of the present invention are possible in light of the above teachings and may be practiced otherwise than as specifically described while within the scope of the appended claims.

What is claimed is:

1. A method for automatically moving an item between a source location and a destination using a robot with an end effector, said method comprising:
    identifying an item having a non-fixed location and orientation within the source location using a first vision system;
    determining a pick location and a pick orientation of the item within the source location using the first vision system;
    determining the location and orientation of a destination using a second vision system;
    planning a plurality of possible paths between the pick location and the destination incorporating geometrical information of the robot and the pick location and the pick orientation and a target location and a target orientation at the destination;
    determining a best path between the source location and the destination by simulating the plurality of possible paths between the source location and the destination;
    picking the item from the source location by the end effector on the robot;
    moving the item along the best path by the robot; and
    placing the item at the destination by the end effector on the robot.

2. The method according to claim 1 wherein the item is disposed within a bin at the source location.

3. The method according to claim 1 wherein the item is disposed upon one of a stand or a carriage or a conveyor at the source location.

4. The method according to claim 1 wherein the first vision system includes a camera located at a fixed position.

5. The method according to claim 1 wherein the first vision system includes a camera located on the robot.

6. A system for automatically moving an item between a structure at a source location and a destination comprising:
    a first vision system configured to identify and determine a pick location and a pick orientation of the item having a non-fixed location and orientation upon the structure;
    a second vision system configured to determine the location and orientation of the destination;
    a robot having an end effector configured to pick the item from the structure and to move the item to the destination; and
    a controller configured to simulate a plurality of possible paths between the pick location and the destination incorporating geometrical information of the robot and the pick location and the pick orientation and the target location and the target orientation; and
    wherein the controller is further programmed to determine, from the plurality of possible paths, a best path for the robot to follow in moving the item between the pick location and the destination.

7. The system for automatically moving an item according to claim 6 wherein said item is a part, and wherein said structure is a bin and wherein said item is disposed within said bin at said source location.

8. The system for automatically moving an item according to claim 6 wherein said item is a container for holding a plurality of parts.

9. The system for automatically moving an item according to claim 6 wherein the first vision system includes a camera located at a fixed position.

10. The system for automatically moving an item according to claim 6 wherein the first vision system includes a camera located on the robot.

11. The system for automatically moving an item according to claim 10 wherein the camera is located on or near the end effector of the robot.

12. The system for automatically moving an item according to claim 6 wherein the second vision system includes a camera located at a fixed position.

13. The system for automatically moving an item according to claim 6 wherein the second vision system includes a camera located on the robot.

14. The system for automatically moving an item according to claim 13 wherein the camera is located on or near the end effector of the robot.

15. The system for automatically moving an item according to claim 6 wherein the first vision system and the second vision system are each configured to use a shared camera mounted on the robot.

16. The method according to claim 1, wherein the source location includes a carriage configured to hold a stack of one or more baskets or bins.

17. The method according to claim 2, wherein the bin is one of a stack of bins; and
    wherein the non-fixed location includes a height of the stack of bins.

18. A method for automatically loading and unloading a machine, said method comprising:

identifying an item having a non-fixed location and orientation within a source location using a first vision system;
determining a pick location and a pick orientation of the item within the source location using the first vision system;
planning a plurality of possible paths between the pick location and a machine input location incorporating geometrical information of a robot and the pick location and the machine input location;
determining a first best path between the source location and the machine input location by simulating the plurality of possible paths between the source location and the machine input location;
picking the item from the source location by and end effector on the robot;
moving the item along the first best path by the robot;
placing the item at the machine input location by the end effector on the robot;
determining the location and orientation of a destination using a second vision system;
planning a plurality of possible paths between a machine output location and the destination location incorporating geometrical information of the robot and the machine output location and the destination location;
determining a second best path and the destination by simulating the plurality of possible paths between the machine output location and the destination location and orientation;
picking the item from the machine output location by the end effector on the robot;
moving the item along the second best path by the robot; and
placing the item at the destination by the end effector on the robot.

19. The method according to claim 18, wherein at least one of the machine input location or the machine output location includes a conveyor belt.

20. The method according to claim 18, wherein at least one of the source location or the destination location includes a stack of a stack of bins having a non-fixed height.

* * * * *